Jan. 29, 1974     J. A. HYNES     3,788,931

LAMINATED PRINTING PLATE BASE

Filed May 30, 1972

United States Patent Office 3,788,931
Patented Jan. 29, 1974

3,788,931
LAMINATED PRINTING PLATE BASE
James A. Hynes, Winnetka, Ill., assignor to Printing Plate Supply Company, Chicago, Ill.
Filed May 30, 1972, Ser. No. 257,916
Int. Cl. C09j 5/00, 7/00
U.S. Cl. 156—309
12 Claims

ABSTRACT OF THE DISCLOSURE

The method of making a laminated printing plate base is disclosed and generally comprises the steps of taking a metal layer and coating the opposite surfaces thereof with a thermo-adhesive; heating the metal layer and adhesive to a predetermined temperature; taking a first layer of thermoplastic material and placing a layer of scrim cloth adjacent one of the surfaces thereof; taking a second layer of thermo-plastic material and placing a second layer of scrim cloth adjacent one of the surfaces thereof; heating the first and second layers of thermo-plastic material to a predetermined temperature; placing the heated layers of thermo-plastic material on opposite sides of the heated metal layer; and subjecting the components to a predetermined temperature and pressure to activate the thermo-adhesive and to laminate the components into a single unitary structure.

---

A commonly employed method of forming a printing plate is to place layers of adhesive, cheesecloth, and plastic material in between an aluminum plate and a printing shell. The assembled components are then placed in a die and exposed to such heat and pressure to cause the adhesive to be activated and to cause the plastic to become molten. The molten state of the plastic requires that the layer of cheesecloth be employed since gas is generated by the process and air will be trapped against the inner surface of the shell if the cheesecloth is not employed. The fact that the dies are heated to such a temperature so that the thermo-plastic becomes molten requires a cooling cycle before the materials can be removed from the dies of the press. The backing materials for the printing shell, normally called the printing plate base, are not prefabricated but are finally assembled only when the printing plate is made.

Therefore, it is a principal object of this invention to provide a method for assembling an improved printing plate base.

A further object of this invention is to provide a method of making a printing plate base which will not require cheesecloth adjacent the die surfaces.

A further object of this invention is to provide a method of making a printing plate base wherein the aluminum plate is preheated prior to being placed in the die.

A further object of this invention is to provide a method of making a printing plate base wherein first and second layers of thermo-plastic material are preheated prior to their being placed in the dies.

A further object of this invention is to provide a method of making a printing plate base which does not require a cooling cycle.

A further object of this invention is to provide a method of making a printing plate base which eliminates air from being trapped against the surfaces of the die.

A further object of this invention is to provide a method of making a printing plate base wherein only the portions of plastic layers adjacent the aluminum layer become molten.

A further object of this invention is to provide a method of making a printing plate base which is economical.

These and other objects will be apparent to those skilled in the art.

This invention consists in the construction, arrangements and combination of the various parts of the device, whereby the objects contemplated are attained as hereinafter more fully set forth, specifically pointed out in the claims, and illustrated in the accompanying drawings in which:

The numeral 10 generally refers to an apparatus for producing molded printing plates or printing plate bases such as described in U.S. Pat. No. 3,613,174. The numeral 12 generally refers to the printing plate base of this invention. A conventional printing shell or surface would be secured to the front surface of the base in conventional fashion and has not been shown for purposes of conciseness.

Figure 6:
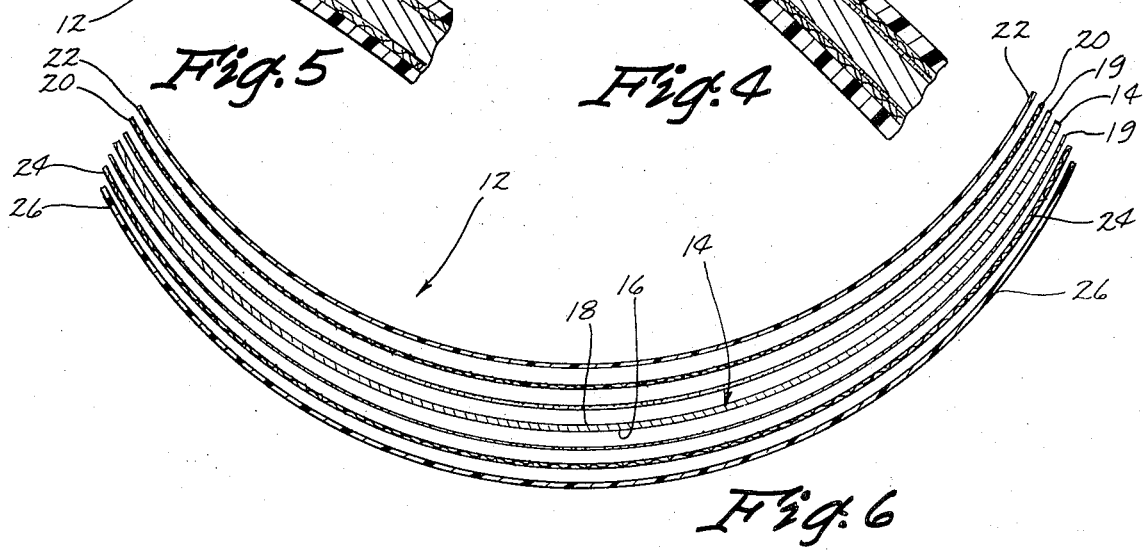
FIG. 6 is an exploded transverse sectional view of the components of the base prior to the components being subjected to pressure within the dies.

The laminated sandwich of materials forming the base is shown in FIG. 6 and includes an aluminum plate 14 having a top surface 16 and a bottom surface 18. The base 12 is formed by first taking the aluminum plate and coating the surfaces 16 and 18 with a thermo-adhesive 19. The coated aluminum plate is then heated to a temperature of 450 degrees to 550 degrees F. A layer of scrim cloth 20 is then placed adjacent one surface of plastic layer 22. A layer of scrim cloth 24 is placed adjacent one of the surfaces of a plastic material 26. The plastic layers 22 and 26 with the scrim cloth attached thereto are then heated to 250 degrees to 300 degrees F. The temperature to which the plastic layers are heated is below the temperature at which they become molten.

Figure 1:
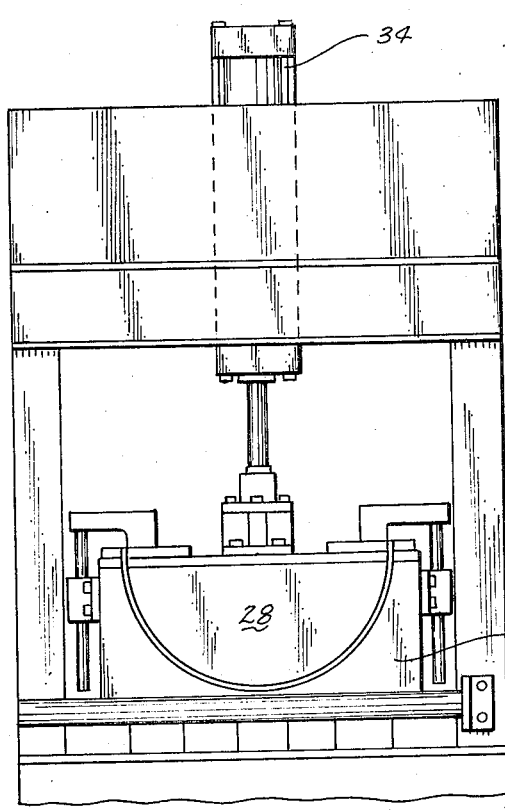
FIG. 1 is an end view of a machine for molding printing plate bases or bonding printing shells to printing plate bases.
Figure 2:
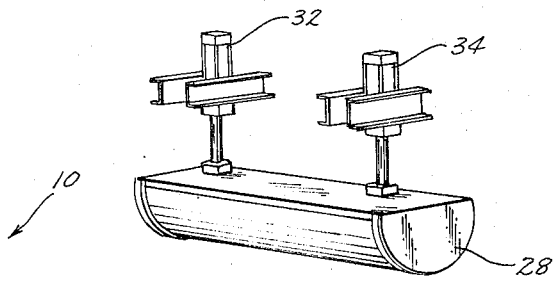
FIG. 2 is a perspective view of the movable die half.
Figure 3:
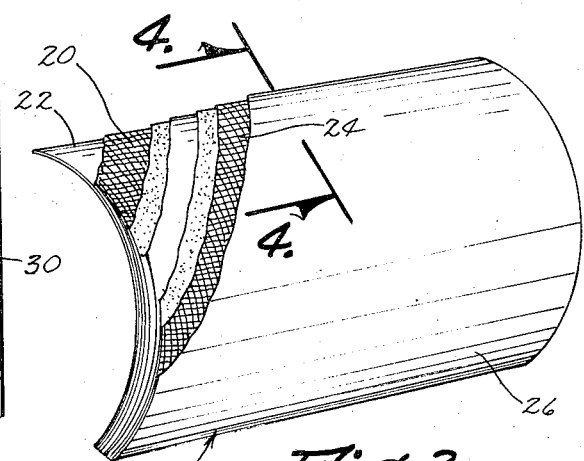
FIG. 3 is a perspective view of the laminated printing plate base with portions thereof cut away to more fully illustrate the invention.
Figure 5:
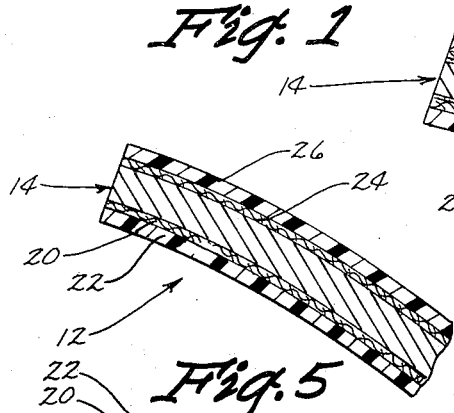
FIG. 5 is a sectional view similar to FIG. 4 except that the components are illustrated after they have been subjected to heat and pressure within the dies.
Figure 4:
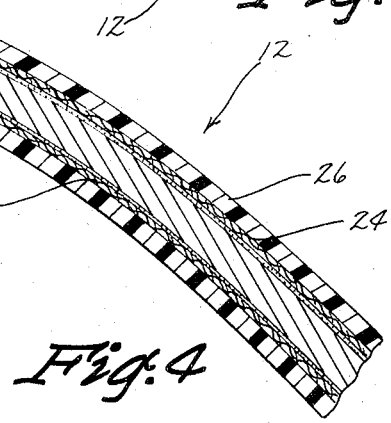
FIG. 4 is an enlarged sectional view seen along lines 4—4 of FIG. 3 prior to the components being subjected to pressure in the dies.

After the plastic layers and the aluminum plate have been separately heated to their predetermined temperatures, the plastic layers 22 and 26 are positioned adjacent the opposite surfaces of the aluminum plate 14 so that the layers of scrim cloth 20 and 24 are positioned adjacent the aluminum plate 14. The components seen in FIG. 6 are then subjected to heat and pressure in the machine 10. Machine 10 includes an upper die half 28 matingly engaging a lower die half 30. As seen in FIG. 2, the upper die half 28 is movable by means of the cylinders 32 and 34. The machine 10 is adapted to heat the components to a temperature from room temperature to 250 degrees F. The heat and pressure imposed on the components activates the thermo-adhesive and laminates the components into a single unitary structure such as seen in FIG. 5. It can be seen in FIG. 5 that the thermo-adhesive bonds the scrim cloth and the plastic layers to the aluminum plate.

It is important to note that advantages of not permitting the plastic to become molten are twofold:

(1) Air is not trapped against the surfaces of the die which eliminates the necessity of cheesecloth layers being provided on the outer surfaces of the thermoplastic material.

(2) The materials may be quickly released from the dies without a cooling cycle.

The fact that the aluminum plate has been preheated causes the plastic adjacent thereto to melt against its surfaces allowing the plastic to absorb the irregularities (hills and valleys) in the contour of the aluminum. In the preferred form of the method, the plastic layers 20 and 26 become molten only on their respective inner surfaces and not throughout their complete thickness. Thus, the method of this invention eliminates the necessity of utilizing cheesecloth layers on the outer layers of the plastic material and the base may be more quickly removed from the dies which speeds up the entire operation.

The printing plates may be of many sizes and typical plates are for example 8" by 10" and 17" by 24". The aluminum plate preferably has a thickness of 0.125" while the plastic, preferably polyvinyl chloride, is 0.050" to 0.063" thick for layer 26 on the outer side while the inner layer of plastic 22 is 0.020" to 0.030" thick. The adhesive used is preferably a plastisol primer adhesive.

The resulting laminated printing plate base is a perfect saddle for a printing shell. The base has the precise measurement desired and does not require any shavings. Any irregularities in the shape of the aluminum plate are compensated for in the melting of the plastic against the preheated aluminum.

The base of this invention greatly enhances the making of printing plates. For example, the bottom die 30 is heated and a conventional electrotype shell is placed thereagainst. The base 12 is placed against the shell with a layer of cheesecloth and adhesive therebetween in accordance with the process of Pat. No. 3,062,139. The outer surface of plastic layer 26 becomes sufficiently molten from the heat through the shell to fill the voids in the shell in accordance with the teachings of said patent. Since only the bottom die needs to be heated, the process is greatly accelerated by having the base previously fabricated as described heretofore. Again, the base of this invention is equally applicable to electrolyte shells and other printing surface materials.

Thus it can be seen that an improved method of making a printing plate base has been provided which eliminates the need for layers of cheesecloth on the outer surfaces of the plastic layers and wherein a cooling cycle has been eliminated.

It can therefore be seen that the invention accomplishes at least all of its stated objectives.

I claim:

1. The method of making a printing plate base, comprising, taking a metal layer having opposite surfaces and coating said surfaces with a thermo-adhesive, heating said metal layer and thermo-adhesive thereon to a predetermined temperature, taking a first layer of plastic material having opposite surfaces, placing a first layer of fibrous material adjacent one of said surfaces of said first layer of plastic material, taking a second layer of plastic material having opposite surfaces, placing a second layer of fibrous material adjacent one of said surfaces of said second layer of plastic material, placing said layers of plastic material on opposite sides of said heated metal layer so that said one surface thereof is positioned adjacent said heated metal layer, and subjecting said aforementioned components to a predetermined pressure to laminate said components into a single unitary structure.

2. The method of claim 1 wherein said metal layer is heated to 450 to 550 degrees F.

3. The method of claim 1 wherein both heat and pressure are applied to said components to activate said thermo-adhesive to laminate said components into a single unitary structure, said predetermined temperature being below the temperature at which said thermo-plastic material becomes molten.

4. The method of claim 1 wherein said metal layer is comprised of an aluminum material.

5. The method of claim 1 wherein said layers of plastic material are heated to 250 to 300 degrees F.

6. The method of claim 1 wherein said components are subjected to a temperature ranging from room temperature to 250 degrees F. to activate said thermo-adhesive and to laminate said components into a single unitary structure.

7. The method of claim 1 wherein said fibrous material is comprised of scrim cloth.

8. The method of claim 1 wherein said components are compressed by said pressure to a predetermined thickness.

9. The method of claim 1 wherein said first and second layers of plastic material are preheated before being positioned adjacent said metal layer to permit said layers to conform to the shape of said metal layer.

10. The method of claim 1 wherein only the surface portion of said plastic layers adjacent said metal layer becomes molten upon being in pressurized contact with said heated metal layer.

11. The method of claim 1 wherein said components are cooled to room temperature, and a printing surface material is then secured to one of said plastic layers.

12. The method of claim 1 wherein said components are cooled to room temperature, a printing surface material and a thermo-adhesive are placed adjacent one of said plastic layers, and heat and pressure are applied to said base and said printing surface material to laminate the same together.

References Cited

UNITED STATES PATENTS

| | | | |
|---|---|---|---|
| 2,728,703 | 12/1955 | Kiernan et al. | 156—321 X |
| 3,277,823 | 10/1966 | Redding | 156—285 X |

WILLIAM A. POWELL, Primary Examiner

U.S. Cl. X.R.

156—245, 321; 264—257, 324